United States Patent Office 2,965,658
Patented Dec. 20, 1960

2,965,658

POLYOXYPROPYLENE DERIVATIVES OF HYDROXY ACID COMPOUNDS

Willard H. Kirkpatrick, Sugar Land, Tex., assignor to Visco Products Company, Sugar Land, Tex., a corporation of Delaware No Drawing. Filed July 2, 1958, Ser. No. 746,108

12 Claims. (Cl. 260—404)

This invention in general relates to new and useful chemicals. These chemicals are particularly useful in the treatment of water-in-petroleum oil emulsions such as petroleum emulsions commonly encountered in the production, handling and refining of mineral oil, for the purpose of separating the water and the oil. Also, these chemicals are useful in the treatment of other water-in-oil type of emulsions wherein the emulsions are produced artificially or naturally and the resolution of the emulsions presents a problem of recovery or disposal.

This application is a continuation-in-part application of my copending application Serial No. 336,876, filed February 13, 1953, now Patent No. 2,881,204, which copending application is a continhation-in-part of my now abandoned application Serial No. 98,162, filed June 9, 1949. As set forth in said applications, petroleum emulsions are in general of the water-in-oil type wherein the oil acts as a continuous phase for the dispersal of finely-divided particles of naturally occurring waters of brines. These emulsions are often extremely stable and will not resolve on long standing. It is to be understood that water-in-oil emulsions may occur artificially resulting from any one or more of numerous operations encountered in various industries.

One type of process involves subjecting an emulsion of the water-in-oil type to the action of a deemulsifying agent of the kind hereinafter described, thereby causing the emulsion to resolve and stratify into its component parts of oil and water or brine after the emulsion has been allowed to stand in a relatively quiescent state.

Still another type of process involves the use of a deemulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A deemulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of my invention is to provide new and useful chemicals containing, as the predominant portion thereof, a polyoxypropylene group.

Another object is to provide new chemicals which have utility in the deemulsification of water-in-petroleum oil emulsions.

Still another object is to provide new and useful chemicals which are surface-active for use in applications where surface-active characteristics are necessary or desirable.

The treating agents employed in accordance with the present invention consist of compositions of high molecular weight which are oxypropylated organic compounds from the group consisting of hydroxy carboxylic esters, hydroxy carboxylates, hydroxy carboxylic acid amides, hydroxy sulfonic acid esters, hydroxy sulfonates and hydroxy sulfonic acid amides, wherein the hydroxy group is oxypropylated with propylene oxide, e.g., 1,2-propylene oxide, with the further provisos that at least 75% of the molecular weight of the effective composition is attributable to oxypropylene groups, and the average molecular weight of the oxypropylated compounds attributable to the oxypropylene groups is at least 2000. Especially good results have been obtained with compositions of the class described wherein the average molecular weights are within the range of 2100 to 7500.

It has been discovered that these compositions have unusual and unexpected properties for resolving water-in-oil emulsions into their component parts. One possible theory which may be postulated for the striking effectiveness of these compositions in resolving petroleum emulsions is a hydrophobe-hydrophile balance which has not been secured heretofore with compositions well known in this art.

The oxyalkylene groups in the compositions provided in accordance with the invention can be derived by employing as a starting material either 1,2-propylene oxide or preformed polyoxypropylene aliphatic compounds derived by oxypropylation with sufficient 1,2-propylene oxide to give compounds having a molecular weight attributable to each propylene oxide chain of at least 2000. If a preformed polyoxyalkylene compound containing a terminal hydroxy group is employed as a starting material the resultant reaction which occurs is a condensation reaction with the effective elimination of water between two hydroxy groups.

It is essential for the purpose of the invention that the carboxy group, or groups if there is more than one carboxy group, be blocked so that the oxyalkylation cannot occur at the acidic group. The same is true with respect to any sulfonic acid groups that might be present. The blocking is effected by salt formation, esterification or amidification.

Among the compounds which can be employed as preformed polyoxypropylene compounds are polyoxypropylene glycols and monoethers of polyoxypropylene glycols wherein one of the polyoxypropylene glycol's hydroxy groups is replaced by an ether group.

Polyoxypropylene compounds now known are available in molecular weights up to about 4000. However, the addition products resulting from the reaction of 1,2-propylene oxide with water are referred to in the literature but the properties are not described in a manner which would permit identification of the product. Monoethers of polyoxypropylene glycols have been described in U.S. Patent 2,448,654 and these compounds, unlike similar polyoxyethylene compounds are immiscible with water and are miscible with paraffinic hydrocarbons, the extent of miscibility being determined by temperature and nature of the ether grouping. The monoethers of polyoxypropylene glycol have unusual temperature-viscosity relationships in that while they retain adequate body at elevated temperatures they do not become unusually viscous at low temperatures. It is significant that these products having molecular weights of 2000 to 3000 are liquids whereas the corresponding polyoxyethylene compounds are solids.

The hydroxy acid derivative which is reacted with the alkylene oxide or a hydroxy polyoxyalkylene compound, as the case may be, preferably has the reactive hydroxy group attached to a terminal carbon atom. This is not essential in every case, but generally speaking, it leads to the formation of products which are more effective for the purpose of the invention. The free acid groups are blocked from reaction with the propylene oxide or the preformed polyoxypropylene compounds either by a salt-forming group, an amide group, or an ester group.

As a further classification and specific illustration of compositions which are adapted for use in this invention, there can be mentioned: the oxyalkylated hydroxy carboxylic acid esters of hydroxy fatty acids (e.g., hydroxy acetic acid, lactic acid, hydroxy butyric acid, hydroxy stearic acid, and/or ricinoleic acid and aliphatic alcohols (e.g., methyl alcohol, ethyl alcohol, propyl alcohol, butyl alcohol, amyl alcohol, hexyl alcohol, lauryl alcohol, cetyl alcohol, oleyl alcohol, stearyl alcohol, and/or myricyl alcohol); the corresponding compounds in which the group which blocks the carboxylic group is a salt-forming group (e.g., sodium, potassium, calcium and/or ammonium); the corresponding compounds in which the group which blocks the acid group is an amide group; the oxyalkylated hydroxy aromatic acid esters, salts and amides (e.g., oxyalkylated salicylic acid esters, salts and amides; oxyalkylated hydroxy naphthoic acid esters, salts and amides; oxyalkylated toluic acid esters, salts and amides; and compounds corresponding to any or all of the previously listed compounds except that the carboxy group is replaced by a sulfonic group. In general, the preferred carboxy and sulfonic acid derivatives employed as starting materials are characterized by containing either one or two hydroxy groups and one, two or three carboxy and/or sulfonic groups. Examples of such compounds containing a single hydroxy group and a single carboxy group are the esters, salts and amides of: the hydroxy fatty acids, hydroxy phenyl acetic acid, the hydroxy naphthoic acids, and the hydroxy benzoic acids. Examples of compounds containing a single hydroxy group and two carboxy groups are the esters, salts and amides of: hydroxy succinic acid, hydroxy phthalic acid and hydroxy terephthalic acid. Examples of compounds containing a single hydroxy group and three carboxy groups are the esters, salts and amides of citric acid. The acid nucleus occurs only once per molecule.

The starting materials which are reacted with the propylene oxide or hydroxy polyoxypropylene compounds can also contain a reactive primary or secondary amino group in addition to the reactive hydroxy group. Examples of such compounds are the esters, salts and amides of the various amino salicylic acids (e.g., para amino salicylic acid); the esters, salts and amides of hydroxy glutamic acid; the esters, salts and amides of serine; the esters, salts and amides of alpha-amino-beta-hydroxyl butyric acid; and the esters, salts and amides of hydroxyproline.

The preferred compounds are those in which the initial carboxy or sulfonic acid esters, salts or amides contain no carbon chains longer than six carbon atoms. Such compounds are more hydrophilic than those in which longer carbon chains are present. By preparing compounds or compositions in which the ether oxygens and carboxy or sulfonic groups are spaced from each other by relatively short carbon chains, the hydrophile properties of the resultant product are increased. At the same time, due to their molecular weight the products have a substantial hydrophobe characteristic and a desirable hydrophobe-hydrophile balance is obtained. If it is desired to increase the hydrophobe characteristic this can be accomplished by employing as the initial reactants compounds containing long chains of carbon atoms, for example, those containing carbon chains of 8 to 30 carbon atoms. If it is desired to increase the hydrophile property of the resultant compounds this can be accomplished by adding additional hydrophile groups, namely, hydroxy, amino, carboxy and sulfonic groups. Thus, in some instances, in order to secure the proper hydrophobe-hydrophile balance it is desirable to hydrolyze the resultant salt, ester or amide to the corresponding acid.

Reactions of this type can be carried out by standard procedures which are well known to those skilled in the art. When the resulting oxyalkylated acid is obtained the free carboxylic or free acidic groups are then reacted with monohydric alcohols, glycols, polyoxyalkylene glycols, amines, alkanolamines and polyamines to modify the surface-active characteristics of the compound to any desired extent. For example, the free acidic groups can be further reacted with alkalis, alcohols and amines to yield inorganic salts, (e.g., sodium, potassium, ammonium), esters (e.g., methyl, ethyl, propyl, butyl and homologous derivatives), amine salts and amides, the amine salts being formed, for example, by reaction with alkyl, alkenyl, aralkyl, aralkenyl, aryl and/or cycloalkyl amines, such as ethyl amine, mono-, di- and triethanol amine, ethylenediamine, propylenediamine, diethylenetriamine, dipropylenetriamine, triethylenetetramine, tetraethylenepentamine, isopropylamine, butylamine, amylamine, cyclohexylamine, aniline, anisidine, toluidine and benzylamine.

The oxyalkylation step proceeds more smoothly and with better yields in the presence of certain catalysts. When using hydroxy ester compositions as starting materials for the oxyalkylation it is important to use a catalyst ratio that is not sufficiently alkaline or acidic to hydrolyze the ester grouping. Boron trifluoride is such a catalyst and is recommended for use with esters. Where salts or amides are used as starting materials it is preferred to use sodium hydroxide which is an excellent catalyst for the oxyalkylation reaction.

Since as indicated above it is possible to prepare the compositions of this invention by various routes and from a number of different classes of starting materials the invention should not be limited by the following examples which are merely intended to illustrate some satisfactory procedures for preparing a few of the materials suitable for employment within the scope of the present invention.

*Example 1*

Step 1.—Ninety-five (95) parts by weight of propylene oxide are introduced initially into 22 parts by weight of methyl glycolate containing 1 part of boron trifluoride dispersed therein. The temperature is maintained at about 115° C. and additional propylene oxide is introduced into the methyl glycolate at such a rate that the pressure is maintained at about 26 pounds per square inch over a period of 3 hours.

Step 2.—To 40 parts by weight of the reaction product of Step 1 is added 0.5 parts by weight of boron trifluoride, following with 70 parts by weight of 1,2-propylene oxide. The temperature is maintained at about 115° C. during the reaction and additional propylene oxide is supplied at such a rate as to maintain a pressure of about 22 pounds per square inch. The reaction time is about 2 hours. The reaction product is a linear carboxy acid ester wherein the chain is composed of oxy-1,2-propylene groupings. The reaction is interrupted at different intervals and a portion of the reaction product is removed in an effort to secure oxyalkylated derivatives having varying molecular weights between 2000 and 3200. For example, it is desired that one derivative have a molecular weight of 2200, the second 2500, the third 2800 and the fourth 3200. This procedure can be varied at will in order to secure derivatives having approximately any specified or desired molecular weight up to about 4000.

*Example II*

One hundred (100) parts by weight of propylene oxide are introduced into 27 parts of ethyl lactate containing 1 part of boron trifluoride dispersed therein. The temperature is maintained at about 120° C. and additional propylene oxide is introduced into the ethyl lactate at such a rate that the pressure is maintained at about 20 pounds per square inch over a period of about 3 hours.

Fifty (50) parts by weight of the reaction product of Step 1 is further reacted following the procedure of Step 2 of Example I. Four derivatives are prepared having molecular weights between 2000 and 3000.

*Example III*

One hundred (100) parts by weight of propylene oxide is initially introduced into 30 parts by weight of the sodium salt of beta hydroxybutyric acid containing 3 parts of pulverized sodium hydroxide dispersed therein. The temperature is maintained at about 125° C. and additional propylene oxide is introduced into the sodium salt at such a rate that the pressure is maintained at about 20 pounds per square inch over a period of about 3 hours.

Fifty (50) parts by weight of the reaction product of Step 1 is further reacted in the presence of an additional 3 parts of pulverized sodium hydroxide with 100 parts by weight of propylene oxide. The temperature is maintained at about 115° C. during the reaction and additional propylene oxide supplied at such a rate as to maintain a pressure of about 22 pounds per square inch. The reaction is interrupted at varying intervals in order to secure derivatives having molecular weights respectively of about 2300, 2500, and 3500.

*Example IV*

One hundred (100) parts by weight of propylene oxide are introduced into 150 parts by weight of the sodium salt of 12-hydroxy stearic acid containing 3 parts of pulverized sodium hydroxide dispersed therein. The temperature is maintained at about 115° C. and additional propylene oxide is introduced into the hydroxy stearic product at such a rate that the pressure is maintained at about 26 pounds per square inch over a period of about 5 hours.

The intermediate product as above prepared is further reacted in accordance with the directions of Step 2 of Example I with the exception that 3 parts of pulverized sodium hydroxide is used in place of the boron trifluoride.

*Example V*

One hundred (100) parts by weight of propylene oxide are introduced into 150 parts by weight of lauramide of glycolic acid containing 3 parts of pulverized sodium hydroxide dispersed therein. The temperature is maintained at about 120° C. and additional propylene oxide is introduced into the amide at such a rate that the pressure is maintained at about 30 pounds per square inch over a period of about 5 hours.

To 100 parts of the above intermediate product there is added an additional 3 parts of pulverized sodium hydroxide followed by 150 parts by weight of 1,2-propylene oxide. The temperature is maintained at about 115° C. during the reaction and additional propylene oxide is supplied at such a rate as to maintain a pressure of about 25 pounds per square inch. The reaction was interrupted at varying intervals in order to secure derivatives having molecular weights of about 2400, 2600, and 3000.

*Example VI*

One hundred (100) parts by weight of propylene oxide is introduced into 50 parts by weight of the ethyl ester of 4-hydroxynaphthoic acid containing 1 part of boron trifluoride dispersed therein. The temperature is maintained at about 115° C. and additional propylene oxide is introduced into the ester at such a rate that the pressure is maintained at about 25 pounds per square inch over a period of about 5 hours.

Fifty (50) parts by weight of the above reaction product is further reacted in accordance with the directions of Step 2 of Example I.

*Example VII*

One hundred (100) parts by weight of propylene oxide are introduced into 50 parts by weight of ethyl salicylate containing 1 part of boron trifluoride dispersed therein. The temperature is maintained at about 120° C. and additional propylene oxide is introduced into the ethyl salicylate at such a rate that the pressure is maintained at 30 pounds per square inch over a period of about 5 hours.

Fifty (50) parts by weight of the above reaction product is further reacted in accordance with the directions of Step 2 of Example I.

*Example VIII*

One hundred (100) parts by weight of propylene oxide are introduced into 50 parts of the sodium salt of 4-hydroxybenzenesulfonic acid containing 3 parts of pulverized sodium hydroxide dispersed therein. The temperature is maintained at about 120° C. and additional propylene oxide is introduced into the sodium salt at such a rate that the pressure is maintained at about 30 pounds per square inch over a period of about 4 hours.

To 40 parts by weight of the above reaction product is added 3 parts by weight of pulverized sodium hydroxide followed by 85 parts by weight of propylene oxide. The temperature is maintained at about 115° C. during the reaction and additional propylene oxide is supplied at such a rate as to maintain a pressure of about 22 pounds per square inch. The reaction is interrupted at varying intervals to obtain derivatives having molecular weights of about 2500 and 3200.

*Example IX*

One hundred (100) parts by weight of propylene oxide introduced into 50 parts of sodium citrate containing 3 parts of pulverized sodium hydroxide dispersed therein. The temperature is maintained at about 115° C. and additional propylene oxide is introduced into the sodium citrate at such a rate that the pressure is maintained at about 32 pounds per square inch over a period of about 4 hours.

To 40 parts by weight of the above reaction product is added 3 parts by weight of pulverized sodium hydroxide followed by 85 parts by weight of propylene oxide. The temperature is maintained at about 110° C. during the reaction and additional propylene oxide is supplied at such a rate as to maintain pressure of about 24 pounds per square inch. The reaction is interrupted at varying intervals to obtain derivatives having molecular weights of about 2500 and 3000.

*Example X*

The procedure is the same as Example VIII except that chemically equivalent proportions of the sodium salt of para amino salicylic acid are employed instead of the sodium salt of 4-hydroxy benzene sulfonic acid.

*Example XI*

The procedure of Example VIII is repeated except that the ethyl ester of 4 hydroxy benzenesulfonic acid is substituted in chemically equivalent proportions for the sodium salt of 4-hydroxy benzene sulfonic acid.

*Example XII*

The procedure of Example V is repeated except that beta hydroxy lauramide is substituted in chemically equivalent proportions for lauramide of glycolic acid.

*Example XIII*

The procedure of Example III is repeated except that ethyl beta hydroxy butyrate is substituted in chemically equivalent proportions for the sodium salt of beta hydroxybutyric acid.

*Example XIV*

The procedure of Example IV is repeated except that diethylamide of 12-hydroxy stearic acid is substituted in chemically equivalent proportions for the sodium salt of 12-hydroxy stearic acid.

The finished products as prepared in accordance with the instructions of the preceding examples are of value in themselves. The oxypropylated esters, the oxypropylated salts and oxypropylated amides all show effective deemulsifying characteristics.

Throughout the specification and claims the following definitions apply:

Alkyl—a monovalent radical derived from an aliphatic hydrocarbon by removal of one hydrogen atom, as, for example, methyl, ethyl, propyl, octyl, cetyl, myricyl and their homologues, preferably containing 1 to 30 carbon atoms;

Alkenyl—a monovalent radical derived from an unsaturated aliphatic hydrocarbon, as, for example, ethenyl (vinyl), allyl, undecenyl, octadecenyl, linolenyl, and their homologues, preferably containing 2 to 18 carbon atoms and having a single double bond;

Aralkyl—a monovalent radical derived from an aromatic substituted aliphatic hydrocarbon, as, for example, benzyl, phenylethyl, phenylpropyl, phenylbutyl, phenyloctyl, phenylcetyl, phenyloctadecyl and homologues, preferably containing 1 to 30 carbon atoms in the alkyl chain;

Cycloalkyl—a monovalent radical derived from a cycloaliphatic hydrocarbon, as, for example, cyclopentyl, cyclohexyl and cycloheptyl;

Aralkenyl—a monovalent radical derived from an aromatic substituted unsaturated aliphatic hydrocarbon, as, for example, styryl, cinnamyl, and homologues;

Aryl—a monovalent radical derived from an aromatic hydrocarbon by removal of one hydrogen atom, as, for example, phenyl and naphthyl.

In referring to the hydroxy carboxylic acid esters, the term "ester" includes the lower alkyl esters as, for example, those derived by reacting a free acid with methyl, ethyl, propyl, isopropyl, butyl, amyl and/or hexyl alcohols, as well as those derived from the higher alcohols such as lauryl alcohol, oleyl alcohol, stearyl alcohol and myricyl alcohol. In referring to the hydroxy carboxylic acid amides, the term "amide" includes those compounds in which the amido nitrogen is primary as well as those amides in which the amido nitrogen is secondary or tertiary. When the amido nitrogen is primary it is linked to two hydrogen atoms. When it is secondary, one of the hydrogen atoms is replaced by a carbon radical such as an alkyl group (e.g., methyl, ethyl, propyl, etc.). When it is tertiary, both of the hydrogen atoms are replaced by carbon radicals, as, for example, alkyl groups.

The deemulsifying compositions are preferably employed in the proportion of 1 part of reagent to from 2000 to 50,000 parts of emulsion either by adding the concentrated product direct to the emulsion or after diluting with a suitable vehicle in the customary manner.

The suitable hydrocarbon vehicle referred to above is sulfur dioxide ($SO_2$) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as $SO_2$ extract. Examples of other suitable hydrocarbon vehicles are Gray Tower polymers, toluene, xylene, gas oil, diesel fuel, Bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and can be successfully used in breaking water-in-oil petroleum emulsions in the mid-continent oil fields, including Oklahoma, Illinois, Kansas, the Gulf coast, Louisiana, Southwest Texas and California.

The invention is hereby claimed as follows:

1. An oxypropylated organic compound from the group consisting of oxypropylated hydroxy carboxylic acids, oxypropylated hydroxy carboxylic acid esters, oxypropylated hydroxy carboxylic acid amides, oxypropylated hydroxy carboxylates, oxypropylated hydroxy carboxylic acid amine salts, oxypropylated hydroxy sulfonic acids, oxypropylated hydroxy sulfonic acid esters, oxypropylated hydroxy sulfonic acid amides, and oxypropylated hydroxy sulfonates wherein the acid radical has 1 to 2 hydroxy groups, with the further provisos that the hydroxy carboxylic acids, hydroxy carboxylic acid esters, hydroxy carboxylic acid amides, hydroxy carboxylates, and hydroxy carboxylic acid amine salts are hydrocarbons substituted with hydroxy and carboxy radicals and 0–1 amino groups, the hydroxy sulfonic acids, hydroxy sulfonic acid amides and hydroxy sulfonates are hydrocarbons substituted with hydroxy and sulfonic acid radicals, and no carbon chain in said oxypropylated organic compound exceeds 30 carbons at least one of the hydroxy groups being oxypropylated with a polyoxypropylene radical sufficiently large that the molecular weight of the compound attributable to the polyoxypropylene radical is at least 2000, and at least 75% of the average molecular weight of the effective organic compound is attributable to the polyoxypropylene groups.

2. An oxypropylated organic compound from the group consisting of oxypropylated hydroxy carboxylic acids, oxypropylated hydroxy carboxylic acid esters, oxypropylated hydroxy carboxylic acid amides, oxypropylated hydroxy carboxylates, oxypropylated hydroxy carboxylic acid amine salts, oxypropylated hydroxy sulfonic acids, oxypropylated hydroxy sulfonic acid esters, oxypropylated hydroxy sulfonic acid amides, and oxypropylated hydroxy sulfonates wherein the acid radical has 1 to 2 hydroxy groups, with the further provisos that the hydroxy carboxylic acids, hydroxy carboxylic acid esters, hydroxy carboxylic acid amides, hydroxy carboxylates, and hydroxy carboxylic acid amine salts are hydrocarbons substituted with hydroxy and carboxy radicals and 0–1 amino groups, the hydroxy sulfonic acids, hydroxy sulfonic acid amides and hydroxy sulfonates are hydrocarbons substituted with hydroxy and sulfonic acid radicals, and no carbon chain in said oxypropylated organic compound exceeds 30 carbons at least one of the hydroxy groups being oxypropylated with a polyoxypropylene radical sufficiently large that the molecular weight of the compound attributable to the polyoxypropylene radical is at least 2000, the polyoxyalkylene radical has on the terminal oxypropylene group a member from the class consisting of a hydroxy group and an ether group, and at least 75% of the average molecular weight of the effective organic compound is attributable to the polyoxypropylene groups.

3. An oxypropylated organic compound from the group consisting of oxypropylated hydroxy carboxylic acids, oxypropylated hydroxy carboxylic acid esters, oxypropylated hydroxy carboxylic acid amides, oxypropylated hydroxy carboxylates, oxypropylated hydroxy carboxylic acid amine salts, oxypropylated hydroxy sulfonic acids, oxypropylated hydroxy sulfonic acid esters, oxypropylated hydroxy sulfonic acid amides, and oxypropylated hydroxy sulfonates wherein the acid radical has 1 to 2 hydroxy groups, with the further provisos that the hydroxy carboxylic acids, hydroxy carboxylic acid esters, hydroxy carboxylic acid amides, hydroxy carboxylates, and hydroxy carboxylic acid amine salts are hydrocarbons substituted with hydroxy and carboxy radicals and 0-1 amino groups, the hydroxy sulfonic acids, hydroxy sulfonic acid amides and hydroxy sulfonates are hydrocarbons substituted with hydroxy and sulfonic acid radicals, and no carbon chain in said oxypropylated organic compound exceeds 6 carbons at least one of the hydroxy groups being oxypropylated with a polyoxypropylene radical sufficiently large that the molecular weight of the compound attributable to the polyoxypropylene radical is at least 2000, the polyoxyalkylene radical has on the terminal oxypropylene group a member from the class consisting of a hydroxy group and an ether group, and at least 75% of the average molecular weight of the effective organic compound is attributable to the polyoxypropylene groups.

4. A monohydroxy carboxylic acid in which only the hydroxy group is oxypropylated with a polyoxypropylene radical sufficiently large that the molecular weight of the oxypropylated compound attributable to the polyoxypropylene radical is at least 2000, the monohydroxy carboxylic acid is a hydrocarbon substituted with hydroxy and at least one carboxy radical, no carbon chain in the monohydroxy carboxylic acid exceeds 30 carbons, and at least 75% of the average molecular weight of the oxypropylated compound is attributable to the polyoxypropylene groups.

5. A monohydroxy carboxylic acid ester in which only the hydroxy group is oxypropylated with a polyoxypropylene radical sufficiently large that the molecular weight of the oxypropylated compound attributable to the polyoxypropylene radical is at least 2000, the monohydroxy carboxylic acid ester is a hydrocarbon substituted with hydroxy and carboxy radicals, no carbon chain in said ester exceeds 30 carbons, and at least 75% of the average molecular weight of the oxypropylated compound is attributable to the polyoxypropylene groups, the ester containing one carboxylic acid nucleus per molecule.

6. A monohydroxy carboxylic acid amide in which only the hydroxy group is oxypropylated with a polyoxypropylene radical sufficiently large that the molecular weight of the oxypropylated compound attributable to the polyoxypropylene radical is at least 2000, the monohydroxy carboxylic acid amide is a hydrocarbon substituted with hydroxy and carboxy radicals, no carbon chain in said amide exceeds 30 carbons, and at least 75% of the average molecular weight of the oxypropylated compound is attributable to the polyoxypropylene groups.

7. A monohydroxy carboxylic acid amine salt in which only the hydroxy group is oxypropylated with a polyoxypropylene radical sufficiently large that the molecular weight of the oxypropylated compound attributable to the polyoxypropylene radical is at least 2000, the monohydroxy carboxylic acid amine salt is a hydrocarbon substituted with hydroxy and carboxy radicals, no carbon chain in said amine salt exceeds 30 carbons, and at least 75% of the average molecular weight of the oxypropylated compound is attributable to the polyoxypropylene groups.

8. A monohydroxy organic carboxylate in which only the hydroxy group is oxypropylated with a polyoxypropylene radical sufficiently large that the molecular weight of the oxypropylated compound attributable to the polyoxypropylene radical is at least 2000, the monohydroxy organic carboxylate is a hydrocarbon substituted with hydroxy and carboxy radicals, no carbon chain in said carboxylate exceeds 30 carbons, and at least 75% of the average molecular weight of the oxypropylated compound is attributable to the polyoxypropylene groups.

9. A monohydroxy sulfonic acid in which only the hydroxy group is oxypropylated with a polyoxypropylene radical sufficiently large that the molecular weight of the oxypropylated compound attributable to the polyoxypropylene radical is at least 2000, the monohydroxy sulfonic acid is a hydrocarbon substituted with one hydroxy and one sulfonic acid radical, no carbon chain in said acid exceeds 6 carbons, and at least 75% of the average molecular weight of the oxypropylated compound is attributable to the polyoxypropylene groups.

10. A monohydroxy sulfonic acid amide in which only the hydroxy group is oxypropylated with a polyoxypropylene radical sufficiently large that the molecular weight of the oxypropylated compound attributable to the polyoxypropylene radical is at least 2000, the monohydroxy sulfonic acid amide is a hydrocarbon substituted with one hydroxy and one sulfonic acid radical, no carbon chain in said acid exceeds 6 carbons, and at least 75% of the average molecular weight of the oxypropylated compound is attributable to the polyoxypropylene groups.

11. A monohydroxy sulfonic acid ester in which only the hydroxy group is oxypropylated with a polyoxypropylene radical sufficiently large that the molecular weight of the oxypropylated compound attributable to the polyoxypropylene radical is at least 2000, the monohydroxy sulfonic acid ester is a hydrocarbon substituted with one hydroxy and one sulfonic acid radical, no carbon chain in said acid exceeds 6 carbons, and at least 75% of the average molecular weight of the oxypropylated compound is attributable to the polyoxypropylene groups.

12. A monohydroxy sulfonate in which only the hydroxy group is oxypropylated with a polyoxypropylene radical sufficiently large that the molecular weight of the oxypropylated compound attributable to the polyoxypropylene radical is at least 2000, the monohydroxy sulfonate is a hydrocarbon substituted with one hydroxy and one sulfonate radical, no carbon chain in said acid exceeds 6 carbons, and at least 75% of the average molecular weight of the oxypropylated compound is attributable to the polyoxypropylene groups.

References Cited in the file of this patent

UNITED STATES PATENTS

| | | |
|---|---|---|
| 2,542,550 | McDermott | Feb. 20, 1951 |
| 2,602,087 | De Groote | July 1, 1952 |
| 2,652,409 | De Groote | Sept. 15, 1953 |